(12) United States Patent
Kinnunen et al.

(10) Patent No.: US 11,416,383 B1
(45) Date of Patent: Aug. 16, 2022

(54) SYSTEMS FOR REMOTE COMMUNICATION WITH TEST DEVICES

(71) Applicant: HEADSPIN, INC., Palo Alto, CA (US)

(72) Inventors: Simo Antti Kalervo Kinnunen, Shibuya-ku (JP); Brien Colwell, Redwood City, CA (US)

(73) Assignee: HEADSPIN, INC., Palo Alto, CA (US)

( * ) Notice: Subject to any disclaimer, the term of this patent is extended or adjusted under 35 U.S.C. 154(b) by 0 days.

(21) Appl. No.: 17/179,136

(22) Filed: Feb. 18, 2021

(51) Int. Cl.
*G06F 9/44* (2018.01)
*G06F 11/36* (2006.01)
*G06F 11/30* (2006.01)

(52) U.S. Cl.
CPC ...... *G06F 11/3688* (2013.01); *G06F 11/3006* (2013.01); *G06F 11/3616* (2013.01); *G06F 11/3656* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 9,107,081 | B1* | 8/2015 | Pezeshkian | ............ H04W 16/26 |
| 9,977,407 | B2* | 5/2018 | Prosak | ................. G05B 19/056 |
| 10,557,889 | B2* | 2/2020 | Montoya | ............. G06F 11/2294 |
| 2002/0186723 | A1 | 12/2002 | Sprague et al. | |
| 2005/0097212 | A1 | 5/2005 | Engel et al. | |
| 2016/0241604 | A1* | 8/2016 | Klein | .................... H04L 65/403 |
| 2019/0363806 | A1* | 11/2019 | Glover | ................... H04B 17/15 |

FOREIGN PATENT DOCUMENTS

EP    1435748 A1    7/2004

OTHER PUBLICATIONS

Noll, Joachim, "PCT Invitation to Pay Additional Fees and Partial International Search Report dated May 12, 2022", Patent Cooperation Treaty Application No. PCT/US2022/070077, Patent Cooperation Treaty, May 12, 2022.

* cited by examiner

*Primary Examiner* — Qamrun Nahar
(74) *Attorney, Agent, or Firm* — Lindauer Law, PLLC

(57) ABSTRACT

Devices at different geolocations are configured to determine and share information regarding execution of an application under various conditions. A device executing the application, or another device connected to the device executing the application, may send data determined by executing the application to a central device. The central device may in turn receive requests from other devices and provide the determined data to the other devices. The devices may be configured to exchange data using native debugging or bridge software on the devices by determining communication parameters that are common to each device, such as protocols, networks, intermediate devices through which communications may be passed, and so forth. To reduce the amount of data that is transmitted portions of the data related to communications between devices, such as acknowledgement codes, may be identified and withheld from sending.

20 Claims, 7 Drawing Sheets

SYSTEMS FOR REMOTE COMMUNICATION WITH TEST DEVICES

BACKGROUND

An application may function differently at different locations, on different devices, and under different network conditions. For example, one or more of these factors may affect the presentation of images, video content, or audio. Acquiring information about characteristics of output presented by a device and the performance of the device while executing an application may be useful to improve performance of the application. However, limited availability of devices at different locations that are able to execute an application may constrain the ability to acquire this information.

INCORPORATION BY REFERENCE

The following United States patents and patent applications are incorporated by reference for all that they contain:

U.S. patent application Ser. No. 14/850,798, filed Sep. 10, 2015 and titled "System for Application Test", now U.S. Pat. No. 9,681,318, is hereby incorporated by reference in its entirety.

U.S. patent application Ser. No. 15/425,757, filed Feb. 6, 2017 and titled "Mobile Device Point of Presence Infrastructure", now U.S. Pat. No. 10,729,038, is hereby incorporated by reference in its entirety.

U.S. patent application Ser. No. 15/425,652 filed Feb. 6, 2017 and titled "System for Management of an Array of Proxy Access Devices", now U.S. Pat. No. 10,855,789 is hereby incorporated by reference in its entirety.

U.S. patent application Ser. No. 15/783,859, filed Oct. 13, 2017 and titled "System for Testing Using Remote Connectivity" is hereby incorporated by reference in its entirety.

U.S. patent application Ser. No. 16/694,886, filed Nov. 25, 2019 and titled "System for Identifying Issues During Testing of Applications" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
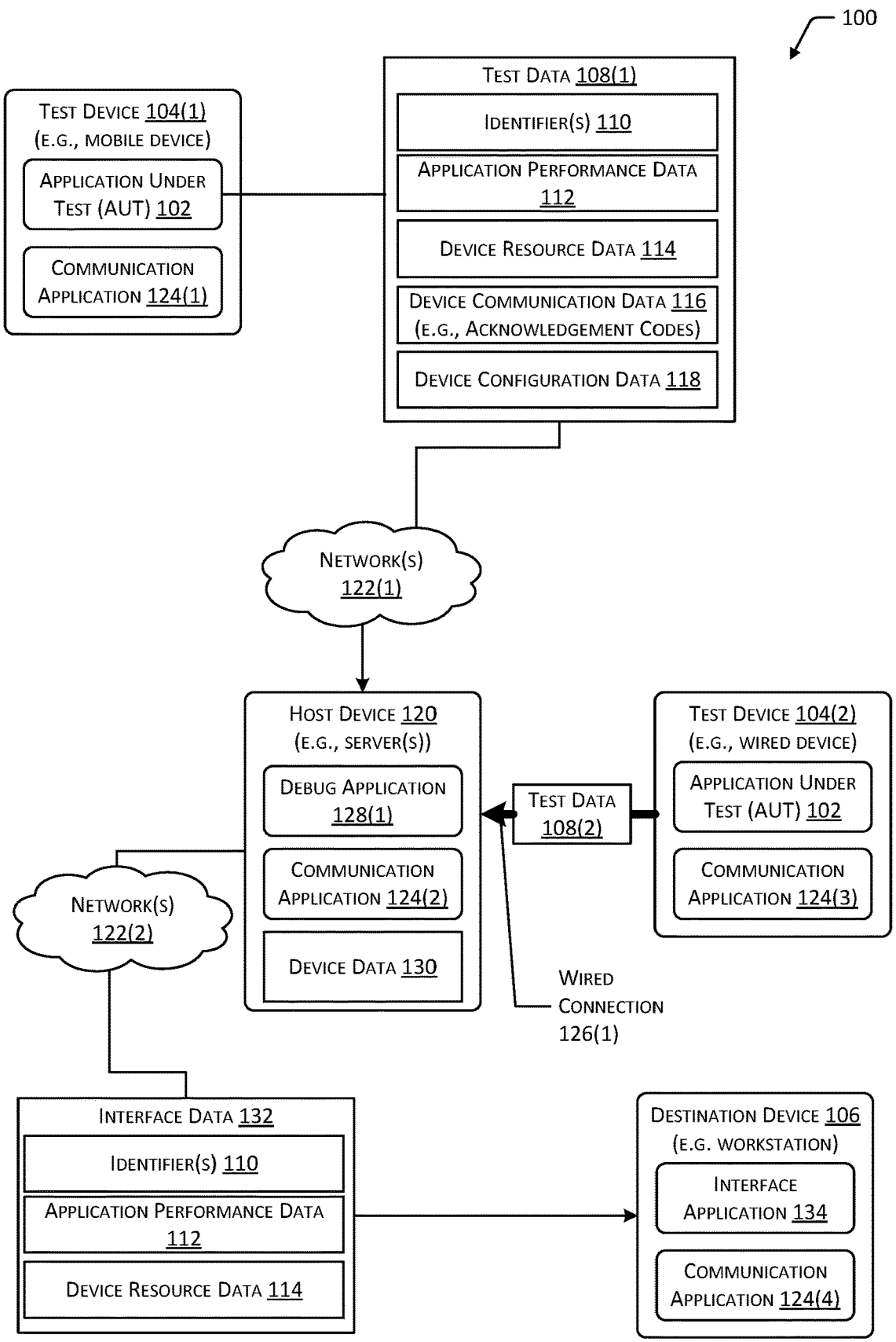
FIG. 1 is a diagram depicting an implementation of a system for providing data associated with an application under test from one or more test devices to a destination device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may provide various functions, some of which may be associated with execution of one or more applications. Computing devices may include, for example, smartphones, laptops, tablet computers, desktop computers, servers, embedded devices, wearable computing devices, appliances, computing devices associated with vehicles, set top box devices, smart televisions, network-enabled speakers, and so forth. Functions provided by such computing devices may include, without limitation, retrieval or transmission of data, presentation of data using a display device, acquisition of data using a camera, output of audio, acquisition of audio data using a microphone, processing of data, and so forth. For example, a smartphone executing an application may present a video using a display, and may output audio associated with the video using a speaker.

The performance of an application executed by a computing device ("device") may be evaluated based on various characteristics, such as video quality, an amount of content that is presented, a frame rate, an amount of data that is transferred, memory use, processor use, and so forth. In some cases, these characteristics may be affected by the location of the device executing the application, characteristics of the device itself, characteristics of one or more networks used to exchange data, and so forth. An application may be tested by executing the application under certain conditions to determine characteristics of an output or of the device executing the application that may indicate acceptable or unacceptable performance of the application. However, configuring multiple types of devices at multiple locations around the world to execute an application, determine data regarding execution of the application, and provide this data to other devices may be a very time and resource-intensive task. The limited availability of devices, locations, network conditions, and so forth that may be tested may hinder the ability to test and improve applications under a wide variety of conditions.

Described in this disclosure are systems and methods for establishing communication between multiple devices to enable devices at various locations to execute an application and provide data associated with execution of the application to other devices. For example, a user in possession of a smartphone, an automotive computing device, or another type of portable, mobile, or personal computing device may make the device accessible to other devices at different locations. The device may then be caused to execute an application, and information associated with performance of the application or of the computing device may be made accessible to other devices. Continuing the example, a computing device may be caused to execute an application to be tested, and information generated while performing a logging or debugging process during execution of the application may be provided to other computing devices to enable performance of the application to be evaluated. This process may enable devices at various locations, including locations to which a user may travel while in possession of a portable or vehicle-based computing device, to execute applications for testing purposes while at those locations. Additionally, use of a computing device associated with a user to test an application may eliminate the need to install and maintain devices at a large number of locations where devices associated with users may be used for this purpose. For example, users may make portable devices at various locations accessible to other devices, reducing or eliminating the need for other computing devices dedicated to the purpose of testing applications to be installed at the locations. Multiple computing devices at different locations may be made accessible in this manner, such that a user at a first geolocation may cause a computing device at a different geolocation to execute an application and generate data, which may be acquired and examined by the user. A server or other computing device may act as an intermediary platform that may receive requests from computing devices to access information associated with other computing devices. Data regarding the protocols, network paths, and other communication parameters associated with each device may be maintained by the server and used to exchange data between computing devices. Additionally, the server or the device executing the application may reduce the amount of data that is exchanged between devices, enabling data that is relevant to the performance of an application or of a device to be transmitted and examined efficiently. For example, a portion of the data related to execution of an application may be associated with configuration of devices and communication between devices, such as acknowledgement codes. Continuing the example, transmission of an acknowledgement code may typically occur for every five kilobytes of data that are transmitted, and transmission of an acknowledgement code may take up to 300 milliseconds or longer. Transmission of every acknowledgement code determined by a computing device may constitute a large amount of data and require significant amounts of time. The server or the device executing the application may identify portions of the data that relate to configuration of devices or communication between devices and withhold this portion of the data from transmission. Other data regarding performance of the application or the device executing the application may be identified and transmitted to other devices. Prevention of transmission of information that is specific to communication and configuration of devices and is not relevant to performance of an application may conserve computational resources and facilitate analysis of the performance of the application.

To make a computing device accessible to other devices, a first computing device executing an application to be tested, or another computing device in communication with the first computing device, may determine data indicative of one or more sets of communication parameters that may be used to communicate with a second computing device. For example, the first computing device may be a smartphone or other portable computing device at a first geolocation, while the second computing device may include a server, host device, or other type of computing device at a second geolocation. Communication parameters associated with the first computing device may include protocols that may be used by the first computing device to communicate with the second computing device, networks that may be used by the first computing device to exchange data with the second computing device, types or formats of data that may be exchanged with the second computing device, intermediate computing devices through which data may be routed, and so forth. The first computing device may provide data indicative of the determined sets of communication parameters to the second computing device, in some cases by accessing an Application Programming Interface (API) configured to establish communication between devices. The second computing device may similarly determine one or more sets of communication parameters that may be used to communicate with the first computing device and provide data indicative of the determined sets of communication parameters to the first computing device, in some cases using the API.

The first computing device and second computing device may determine a specific set of communication parameters, or in some cases multiple sets of communication parameters, for use exchanging data based on communication parameters that are common between the sets of communication parameters determined by each device. In some implementations, one or more security features, such as firewalls or other constraints that limit the communication parameters that may be used, may also be determined. The set of communication parameters used to exchange data between the first computing device and second computing device may exclude communication parameters that are unavailable for use due to one or more security features. For example, a firewall may prevent direct transmission of data from the first computing device to the second computing device. As a result, the determined set of communication parameters may include transmission of data via an intermediate computing device that is not prevented by the firewall from sending data to the second computing device. In other implementations, communication metrics associated with different sets of communication parameters may be determined, and the set of communication parameters used by the first computing device and the second computing device to exchange data may be determined based in part on the communication metrics. For example, one or more metric values indicative of latency, data throughput, or other communication metrics may be determined for different sets of communication parameters. Continuing the example, a set of communication parameters used by the first computing device and second computing device may be selected by determining a set of communication parameters associated with lower latency or greater data throughput than one or more other sets of communication parameters, or than one or more threshold values. In still other implementations, geolocations of the first and second computing devices may be determined, such as through analysis of network addresses or other data associated with the computing devices, and communication parameters may be selected based in part on the geolocations. For example, a set of communication parameters that include transmission of data using a relay server that is physically proximate to the geolocation of one of the computing devices may be selected over other sets of communication parameters that utilize devices that are remote from the locations of the computing devices. In some implementations, multiple sets of communication parameters that are usable by the first computing device and the second computing device may be used to establish communication and exchange data between the first computing device and the second computing device. For example, the first computing device and the second computing device may exchange data using multiple methods of communication simultaneously to increase the rate at which data may be exchanged. In other cases, the first computing device and second computing device may establish two communication methods, begin communication using a first method, then continue communication using a different method. For example, if the first computing device is disconnected from a wired network connection, the first computing device may continue to exchange data with the second computing device using a wireless connection. As yet another example, different methods of communication may be selected and used for test purposes, such as to determine performance of an application under different conditions, using different networks, or using different components of the computing devices.

After determining one or more methods by which the first computing device (or another computing device in communication with the first computing device) may provide data to the second computing device, data associated with execution of an application may be sent to the second computing device based on the determined communication parameters. In some implementations, the second computing device may include one or more servers or other types of computing devices that store data associated with various devices and applications. For example, the second computing device may receive a request from a third computing device that is indicative of the executed application, the first computing device, or a location or other condition associated with the first computing device. In response to the request, the second computing device may indicate available devices, such as the first computing device, which may be caused to execute the application and provide data. The first computing device may be caused to execute the application, and at least a portion of the data associated with execution of the application may be acquired from the first computing device, then sent from the second computing device to the third computing device. For example, the third computing device may generate or access a user interface that is based on data associated with execution of the application by the first computing device. Continuing the example, a user interface may present one or more of screen capture data, audio capture data, input data representative of input received by the first computing device, values indicative of use of computational resources, or values indicative of communication metrics associated with execution of the application by the first computing device.

In some implementations, the first computing device, or another computing device in communication with the first computing device, may determine a first portion of the data associated with execution of the application that is related to communication between the first computing device and the second computing device, configuration of the first computing device, and so forth. For example, the first portion of the data may include acknowledgement codes, data indicative of communication parameters between devices, data indicative of configuration of the devices, and so forth. The first computing device may determine a second portion of the data associated with performance of the application or performance of the first computing device during execution of the application. The first computing device may then send the second portion of the data to the second computing device while withholding the first portion of the data to reduce the amount of data transmitted from the first computing device. In other implementations, the second computing device may receive the data associated with execution of the application from the first computing device and may determine the first portion and second portion of the data. The second computing device may then send the second portion of the data to one or more other computing devices while withholding transmission of the first portion of the data.

As described previously, in some implementations, the first computing device may include a smartphone or other type of computing device associated with a user at a first geolocation. The second computing device may include a server or other type of host device that acts as a platform for storing data associated with other computing devices and receiving requests to cause devices to perform functions and to access data associated with the devices. For example, a third computing device may provide a request to the second computing device, and the second computing device may provide data associated with one or more other computing devices to the third computing device in response to the request. However, in other implementations, one or more of the first computing device or third computing device may also function as a platform or intermediate computing device, and use of a separate second computing device may be omitted. For example, the first computing device may execute an application and store data associated with execution of the application. The first computing device may then receive requests from other computing devices and may provide data associated with execution of the application to the other computing devices. In other cases, one or more computing devices may be connected to the second computing device, such as by using a wired connection. For example, the first computing device, third computing device, or one or more other computing devices may communicate directly with the second computing device via the wired connection.

Additionally, as described previously, in some cases, the first computing device may communicate with another computing device using wired communication. For example, the first computing device may be a smartphone that is physically connected to a personal computer using a wired connection. In such a case, the first computing device may execute an application and provide data associated with execution of the application to the connected computing device via the wired connection. The connected computing device may then provide at least a portion of the data to the second computing device for access by other computing devices.

In other cases, the first computing device may communicate with another computing device using wired communication, and the connected computing device may be used to configure the first computing device for communication with the second computing device or other computing devices. For example, the first computing device may include a smartphone, and an additional computing device may be incorporated within a hardware dongle or other type of peripheral that engages the first computing device. The additional computing device may configure the first computing device to exchange data with the second computing device when engaged with the first computing device or upon startup of the first computing device. For example, each time that the first computing device is deactivated then restarted, a computing device in an attached dongle or other peripheral may provide data associated with a communication application or other data to configure the first computing device to exchange data with the second computing device.

Implementations within the present disclosure may therefore enable data associated with execution of an application by a device, such as data that would normally be accessible using a debug bridge application, to be accessed remotely as though a first device executing the application were in the same geolocation as a second device being used to access the data. Limiting the amount of data that is transmitted, such as by determining and withholding transmission of acknowledgement codes and other data that may not directly relate to performance of the application, may optimize exchanges of data over high latency Wide Area Networks (WANs), such as cellular networks between distant geolocations. Implementations within the present disclosure may function at the application layer, rather than the transport layer, enabling native debug bridge applications to be used to access and control the exchange of data, rather than relying on transmitting and translating each packet received via a transport protocol. In other cases, packets of data may be processed, such as by translating packets from a native debug protocol to other protocols or formats that may be processed by one or more devices that receive the data.

FIG. 1 is a diagram 100 depicting an implementation of a system for providing data associated with an application under test (AUT) 102 from one or more test devices 104 to a destination device 106. A first test device 104(1) may include any type of computing device including, without limitation, a smartphone, a portable computing device, an automotive computing device, a wearable computing device, a personal computer, one or more servers, and so forth. The first test device 104(1) may store the AUT 102, or another computing device in communication with the first test device 104(1) may store the AUT 102 and provide data associated with the AUT 102 to the first test device 104(1). The first test device 104(1), or a computing device in communication with the first test device 104(1), may be configured to generate first test data 108(1) during execution of the AUT 102. In some implementations, the first test data 108(1) may include one or more identifiers 110 indicative of the test device 104(1), the AUT 102, the first test data 108(1) itself, and so forth. The identifier(s) 110 may include any type of data that may be used to differentiate the first test device 104(1), AUT 102, or first test data 108(1) from other devices, applications, or data. For example, an identifier 110 may include a device name, network address, or other alphanumeric data indicative of the first test device 104(1). The first test data 108(1) may include application performance data 112 indicative of functions associated with execution of the AUT 102. For example, application performance data 112 may include screen capture data indicative of video or image output presented by the first test device 104(1), such as a data stream indicative of data presented using a display, audio capture data indicative of audio output, an indication of components of the first test device 104(1) that are utilized such as a display, speaker, microphone, camera, ports, radios or other communication components, and so forth. Continuing the example, application performance data 112 may indicate quantities of data associated with the AUT 102 that are transmitted or received by the first test device 108(1) over time. As another example, application performance data 112 may include data streams indicative of data presented using a display, speaker, or other output device, or data acquired using a camera, microphone, or other input device. The first test data 108(1) may additionally include device resource data 114 indicative of particular resources or components used by the first test device 104(1) or other computing device, such as processor or memory utilization, an amount of data sent or received, use of one or more components of the first test device 104(1) or other device such as a display or speaker, and so forth. In some cases, the first test data 108(1) may include data indicative of characteristics of the first test device 104(1) or other device, such as one or more hardware or software components of the first test device 104(1) or other device, a location associated with the first test device 104(1) or other device, and so forth. In some cases, the first test data 108(1) may include data indicative of characteristics of communication using one or more networks, such as latency, data throughput, a path of computing devices or networks through which data is sent or received, and so forth.

In some implementations, the first test data 108(1) may also include information that may not necessarily be indicative of performance of the AUT 102 or of the first test device 104(1) during execution of the AUT 102. For example, the first test data 108(1) may include device communication data 116 indicative of characteristics of communications between the first test device 104(1) and other computing devices, such as acknowledgement codes. The first test data 108(1) may additionally include device configuration data 118 indictive of characteristics of communications such as protocols, types or formats of data, types of networks, communications, or components used by the first test device 104(1), and so forth.

The first test device 104(1) may provide at least a portion of the first test data 108(1) to a host device 120 using one or more networks 122(1). In some implementations, the first test device 104(1) may provide portions of the first test data 108(1) associated with performance of the AUT 102 to the host device 120, such as the identifier(s) 110, application performance data 112, and device resource data 114. The first test device 104(1) may refrain from transmitting device communication data 116 and device configuration data 118 to reduce the amount of data sent to the host device 120 and the amount of time necessary to exchange data with the host device 120. In other implementations, the first test device 104(1) may send the device communication data 116 and device configuration data 118 to the host device 120, and the host device 120 may determine particular portions of the first test data 108(1) to provide to other computing devices.

The first test device 104(1) may communicate with the host device 120 using the Internet or one or more other wide area networks (WANs), local area networks (LANs), cellular networks, and so forth. The first test device 104(1) may determine one or more communication parameters that may be used to exchange data with the host device 120 using a first communication application 124(1). The first test device 104(1) may store and execute the first communication application 124(1), or another computing device in communication with the first test device 104(1) may provide the first communication application 124(1), or data indicative of communication parameters determined using the first communication application 124(1), to the first test device 104(1). Communication parameters may include one or more protocols, networks 122(1), types or formats of data, network paths, intermediate computing devices that may receive data from or transmit data to the first test device 104(1), and so forth. For example, a set of communication parameters may represent a combination of protocols, networks, data types, and routing of data by which the first test device 104(1) may successfully exchange data with the host device 120. In some implementations, the communication application 124(1) may interface with the AUT 102, with system applications or operating systems of the first test device 104(1), with native debug or bridge applications of the first test device 104(1), and so forth. Additionally, in some implementations, the communication application 124(1) may interface with an Application Programming Interface (API) that may exchange data indicative of communication parameters between the first test device 104(1) and the host device 120 to establish communication between the devices.

The host device 120 may store or be associated with a second communication application 124(2), which may determine one or more sets of communication parameters that may be used to exchange data with the first test device 104(1), and with other computing devices. The communication applications 124 associated with the first test device 104(1) and the host device 120 may also control various aspects of communication between the devices. For example, the communication applications 124 may control peer selection, establishment of connections between devices, relay of data to other devices, encryption of data, buffering of data, retransmission of data, communications to an API that may exchange data indicative of communication parameters between devices, and so forth. The host device 120 may include any type of computing device including, without limitation, the types of computing devices described with regard to the first test device 104(1). For example, the host device 120 may include one or more servers. In some implementations, the host device 120 may itself function as a test device 104. For example, the host device 120 may execute the AUT 102 and may generate test data 108 associated with execution of the AUT 102. In other cases, the host device 120 may communicate with multiple test devices 104. For example, while FIG. 1 depicts the first test device 104(1) communicating with the host device 120 using one or more networks 122(1), the host device 120 may communicate with any number of additional test devices 104 using the same network(s) 122(1) used to communicate with the first test device 104(1), or one or more other networks 122. Additionally, in some implementations, the host device 120 may communicate with one or more additional test devices 104(2) using wired or wireless communication. For example, the host device 120 may include a server or other type of computing device placed at a selected geolocation within an enclosure that contains one or more test devices 104(2), and the test devices 104(2) may be in communication with the host device 120.

Continuing the example, FIG. 1 depicts a second test device 104(2) in communication with the host device 120 using a wired connection 126(1). In other implementations, the second test device 104(2) may communicate with the host device 120 using wireless communication, one or more networks 122, and so forth. The second test device 104(2) may store the AUT 102 or may be in communication with another computing device that stores the AUT 102 and provides data associated with the AUT 102 to the second test device 104(2). In some implementations, the second test device 104(2) may include a communication application 124(3) that may be used to determine one or more sets of communication parameters that may be used to exchange data with the host device 120. In other implementations, use of the communication application 124(3) may be omitted due to the exchange of data between the second test device 104(2) and the host device 120 using the wired connection 126(1). The second test device 104(2) may provide second test data 108(2), indicative of execution of the AUT 102 by the second test device 104(2) or another device, to the host device 120. The second test data 108(2) may include the same types of data described with regard to the first test data 108(1). In some implementations, the second test device 104(2) may provide only a portion of the second test data 108(2), such as application performance data 112 and device resource data 114, to the host device 120 while refraining from sending data that is not associated with performance of the AUT 102, such as device communication data 116 and device configuration data 118. While FIG. 1 depicts the second test device 104(2) communicating with the host device 120 using a wired connection 126(1), in other implementations, the second test device 104(2) or other test devices 104 at the same geolocation as the host device 120 may communicate with the host device 120 using wireless communication.

A debug application 128(1) or another type of application associated with the host device 120 may process the test data 108 received from one or more test devices 104. For example, the debug application 128(1) may include a debug bridge, a daemon, or a similar component executing on one or more of the host device 120 or the test device(s) 104. In some implementations, the host device 120 may also determine device data 130 associated with the test devices 104 from which test data 108 is received. For example, the device data 130 may associate a device identifier for a particular test device 104 with characteristics of the test device 104, such as hardware or software components of the test device 104, a device type, and so forth. The device data 130 may also associate the device identifier for the test device 104 with data indicative of the communication parameters used to exchange data with the test device 104. For example, the host device 120 may use communication parameters indicated in the device data 130 to transmit data to or receive data from particular test devices 104.

The destination device 106 may exchange data with the host device 120 using one or more networks 122(2). The networks 122(2) used by the destination device 106 may be the same as those used by the first test device 104(1), or one or more different networks 122(2). For example, the destination device 106 may be located in a first geolocation and may provide a request to the host device 120 to cause a test device 104(1) in a second geolocation to execute the AUT 102 and acquire test data 108(1). In response to a request from the destination device 106, the host device 120 may provide interface data 132 indicative of at least a portion of the test data 108 received from one or more test devices 104 to the destination device 106. In some implementations, the interface data 132 sent to the destination device 106 may omit portions of the test data 108 that are not associated with performance of an AUT 102 or of a test device 104 while executing the AUT 102. For example, the interface data 132 may include one or more identifiers 110 indicative of test devices 104, AUTs 102, and so forth, application performance data 112, and device resource data 114, but may not necessarily include device communication data 116, device configuration data 118, or other test data 108 that is not indicative of performance of the AUT 102 or test devices 104. In some implementations, the destination device 106 may present a user interface based on the interface data 132. For example, a user interface may present an indication of computational resources used by one or more test devices 104, device components used, amounts of data sent or received, metric values associated with the network(s) 122(1), video and audio data associated with execution of the AUT 102, and so forth. An interface application 134 associated with the destination device 106 may receive the interface data 132 and present a user interface. In some implementations, the interface application 134 may also be used to provide requests or other data to the host device 120, such as to cause test devices 104 to execute applications or perform other functions, to request data associated with particular applications or test devices 104, and so forth. While FIG. 1 depicts the host device 120 providing interface data 132 to the destination device 106, in other implementations, the host device 120 may send at least a portion of the test data 108 to the destination device 106, or may determine log data indicative of the functions performed by a test device 104 while executing the AUT 102, and send at least a portion of the log data to the destination device 106. The destination device 106 may also store a communication application 124(4), which may be used to determine sets of communication parameters for exchanging data with the host device 120.

While FIG. 1 depicts the destination device 106 receiving data indicative of execution of the AUT 102 by one or more other computing devices, in other implementations, the destination device 106 may also provide data to the host device 120 and may be made available to execute the AUT 102 or perform other functions in response to requests received by the host device 120. For example, the destination device 106 may be caused to execute an AUT 102, or perform other functions, and determine test data 108, or other types of data, that may be provided to the host device 120 for access by other devices. Continuing the example, the device data 130 stored in association with the host device 120 may be associated with multiple computing devices, including the test devices 104 and the destination device 106, that have been configured using the communication application 124 to exchange data with the host device 120. A user of a computing device that is in communication with the host device 120 may provide a request indicative of a particular computing device, application, geolocation, or other characteristic, and the host device 120 may cause one or more computing devices, including one or more test devices 104 or destination devices 106 to execute the AUT 102 or perform other functions in response to the request, then provide data to the requesting device.

Figure 2:
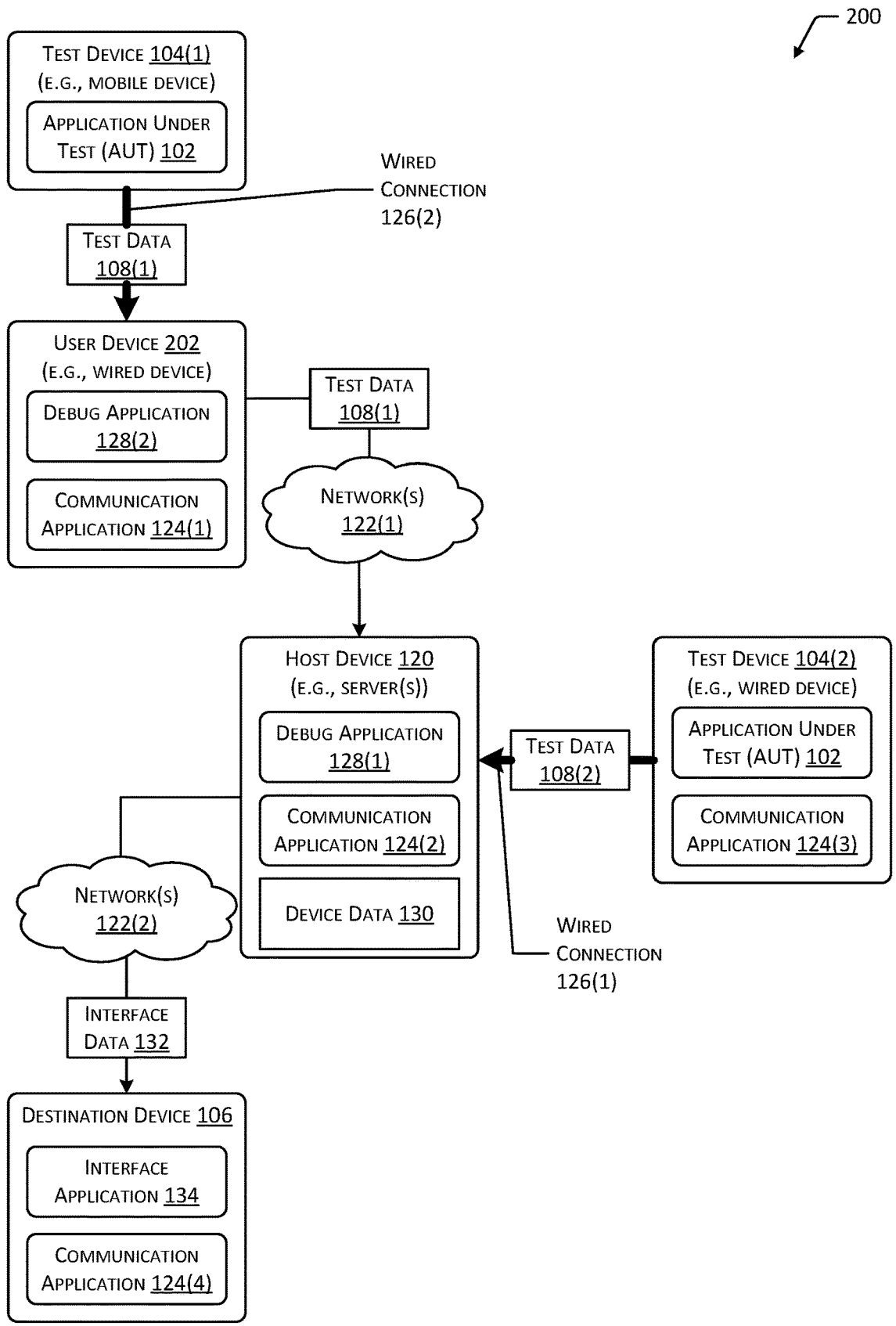
FIG. 2 is a diagram depicting an implementation of a system for providing data associated with an application under test using a computing device in wired communication with a test device that executes the application under test.

FIG. 2 is a diagram 200 depicting an implementation of a system for providing data associated with an application under test (AUT) 102 using a computing device in wired communication with a test device 104(1) that executes the application under test (AUT) 102. For example, a test device 104(1) may be unable to provide test data 108(1) directly to the host device 120, or it may be undesirable for the test device 104(1) to provide data to, or receive data from, the host device 120. In such a case, the test device 104(1) may communicate with a user device 202 using a wired connection 126(2), or in other implementations, a wireless communication method. For example, the test device 104(1) may determine test data 108(1) associated with execution of the AUT 102 and may provide at least a portion of the test data 108(1) to the user device 202 via the wired connection 126(2). In some implementations, the portion of the test data 108(1) provided to the user device 202 may omit portions of the test data 108(1) that are associated with device communications or configurations, such as acknowledgement codes. In other implementations, the test device 104(1) may provide the entirety of the test data 108(1) to the user device 202, which may determine portions of the test data 108(1) to be provided to other computing devices. The user device 202 may include any type of computing device including, without limitation, the types of computing devices described with regard to the test devices 104, destination device 106, or host device 120. For example, the first test device 104(1) may include a smartphone, the user device 202 may include a personal computer, and the wired connection 126(2) may include engagement between the first test device 104(1) and a Universal Serial Bus (USB) port of the user device 202.

A debug application 128(2) or another type of application associated with the user device 202 may process the test data 108(1) received from the first test device 104(1). For example, the debug application 128(2) may include a debug bridge, a daemon, or a similar component. In some implementations, the user device 202 may determine a portion of the test data 108(1) associated with communication between the first test device 104(1) and the user device 202 or associated with configuration of the first test device 104(1) or the user device 202, which may include device communication data 116 or device configuration data 118 as described with regard to FIG. 1. In other implementations, the test device 104(1) may determine this portion of the test data 108(1). Portions of the test data 108(1) that are associated with configuration of the first test device 104(1), configuration of the user device 202, or communication between the first test device 104(1) and the user device 202 may be withheld from transmission to the host device 120, while other portions of the test data 108(1) associated with performance of the AUT 102 or performance of the first test device 104(1) during execution of the AUT 102 may be sent. While FIG. 2 depicts an implementation in which the user device 202 is in communication with the first test device 104(1) using a wired connection 126(2), in other implementations, the user device 202 and first test device 104(1) may communicate using wireless methods. For example, the user device 202 and first test device 104(1) may communicate using one or more LANs or other types of networks 122.

The user device 202 may store the first communication application 124(1) or may communicate with another computing device, such as the first test device 104(1), that stores the first communication application 124(1). As described with regard to FIG. 1, the first communication application 124(1) may be used to determine one or more sets of communication parameters for communication between the user device 202 and the host device 120. The host device 120 may similarly use a communication application 124(2) to determine sets of communication parameters for communication with the user device 202, and with other computing devices, such as additional test devices 104(2), the destination device 106, and so forth. The host device 120, or another computing device in communication with the host device 120, may store device data 130 indicative of communication parameters that may be used to communicate with various computing devices. In some implementations, the user device 202 may store device data 130 indicative of communication parameters used to communicate with the host device 120, the first test device 104(1), or other computing devices.

As described with regard to FIG. 1, the host device 120 may receive and process test data 108 from one or more test devices 104 using a debug application 128(1) or another type of application. In response to a request from a destination device 106, the host device 120 may cause one or more test devices 104 to execute an AUT 102 or perform other functions, determine test data 108 from the test device (s) 104, and so forth. The host device 120 may send interface data 132, log data, at least a portion of the determined test data 108, or other data indicative of the test data 108 to the destination device 106. An interface application 134 associated with the destination device 106 may cause presentation of at least a portion of the received data in an interface accessible to one or more users.

Figure 3:
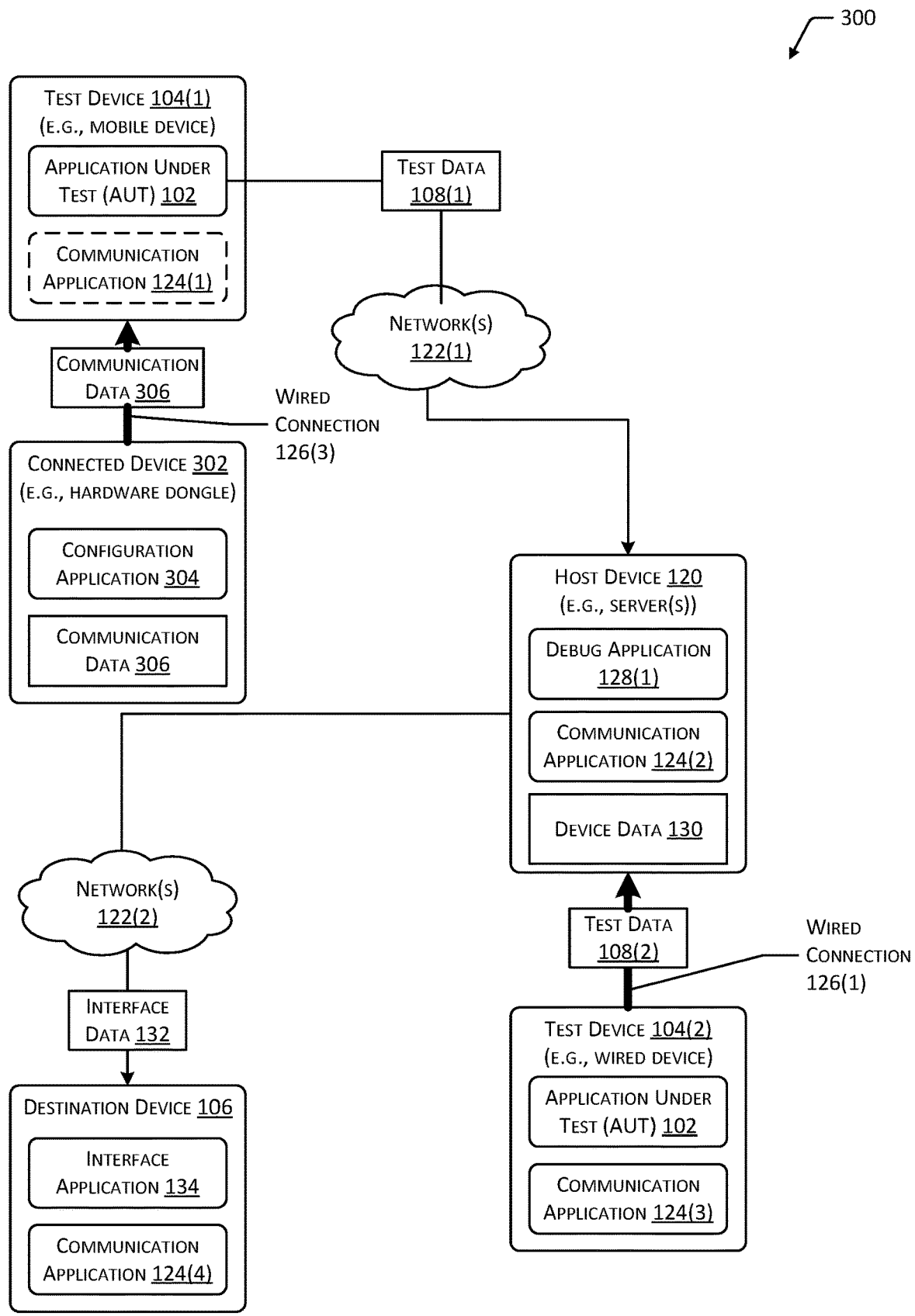
FIG. 3 is a diagram depicting an implementation of a system for configuring a test device to provide data associated with an application under test to other devices using a separate computing device, such as a device connected using a wired connection, to configure the test device.

FIG. 3 is a diagram 300 depicting an implementation of a system for configuring a test device 104(1) to provide data associated with an application under test 102 to other devices using a separate computing device, such as a device connected using a wired connection 126(3), to configure the test device 104(1). For example, a first test device 104(1) may initially be unable to send test data 108(1) to a host device 120 or other computing devices. Continuing the example, configuration of the first test device 104(1) to exchange data with the host device 120 may include installation of a communication application 124(1), modifying one or more system configurations associated with the first test device 104(1), and so forth. In some cases, performing certain functions using the first test device 104(1), such as deactivating, rebooting, or power cycling the first test device 104(1), may cause the first test device 104(1) to return to a default configuration that is unable to exchange data with the host device 120. In such a case, a connected device 302 that is engaged with the test device 104(1), such as using a wired connection 126(3), may configure the first test device 104(1) for communication with the host device 120. In other implementations, the connected device 302 may communicate with the first test device 104(1) using wireless communication, such as one or more LANs.

In some implementations, the connected device 302 may include a hardware dongle or other type of peripheral that may engage one or more ports or other components of the first test device 104(1). The connected device 302 may include one or more processors, data storage, and so forth. For example, the connected device 302 may include a small computing device, such as a mini PC, that may execute various computer-executable instructions to transmit data to the first test device 104(1) or change one or more configurations associated with the first test device 104(1). Continuing the example, a configuration application 304 associated with the connected device 302 may cause the connected device 302 to transmit communication data 306 to the first test device 104(1) and cause the first test device 104(1) to modify one or more configurations based on the communication data 306. In some implementations, the communication data 306 may include the communication application 124(1). For example, the connected device 302 may be used to install or transfer the communication application 124(1) to data storage associated with the first test device 104(1). In other implementations, the connected device 302 may execute the communication application 124(1) and may provide communication data 306, such as data indicative of communication parameters, to the first test device 104(1) to configure the first test device 104(1) to exchange data with the host device 120. In some implementations, the connected device 302 may be configured to provide the communication data 306 to the first test device 104(1) upon occurrence of one or more conditions, such as each time the first test device 104(1) is rebooted or power-cycled. In other implementations, the connected device 302 may be configured to determine the absence of the communication application 124(1) or the absence of one or more configurations or settings associated with the first test device 104(1) and to provide communication data 306 to the first test device 104(1) in response to this determination. In still other implementations, the connected device 302 may execute the communication application 124(1) to communicate with the host device 120 in place of or in addition to the first test device 104(1).

As described with regard to FIG. 1, the communication application 124(1), whether executed by the first test device 104(1) or the connected device 302, may be used to determine one or more sets of communication parameters for communication between the first test device 104(1) and the host device 120. The first test device 104(1) may transmit test data 108(1) indicative of performance of the AUT 102, or of the first test device 104(1) while executing the AUT 102, to the host device 120 based on a determined set of communication parameters. The host device 120 may cause one or more test devices 104 to execute the AUT 102 or perform other functions, determine test data 108 or other data from the test devices 104, and provide at least a portion of the test data 108, log data based on the test data 108, interface data 132 based on the test data 108, or combinations thereof to a destination device 106.

Figure 4:
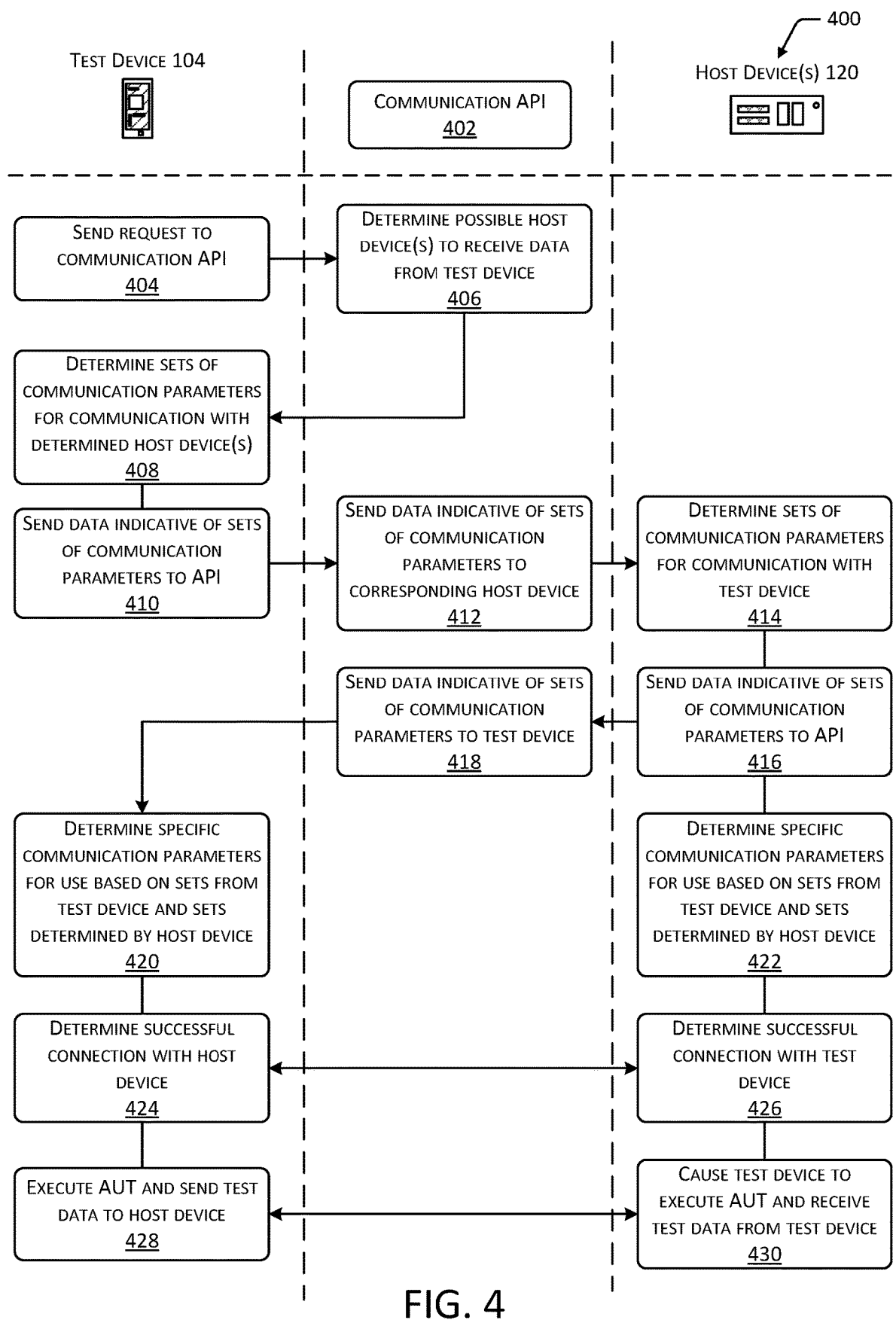
FIG. 4 is a flow diagram depicting an implementation of a method for establishing communication between a test device and a host device.

FIG. 4 is a flow diagram 400 depicting an implementation of a method for establishing communication between a test device 104 and a host device 120. To establish communication with the test device 104, the test device 104 and host device 120 may communicate with a communication Application Programming Interface (API) 402 that may establish one or more methods of communication between the test device 104 and host device 120.

At 404, the test device 104 may send a request to the communication API 402. The request may indicate a particular host device 120, characteristics of one or more host devices 120, such as networks or geolocations, characteristics of the test device 104, and so forth. Based on the request, at 406, the communication API 402 may determine possible host devices 120 that may receive data from the test device 104. For example, a request may indicate host devices 120 that are able to receive a certain type of data associated with an AUT 102 and that are able to access a particular network 122. The communication API 402 may determine host devices 120 that match the characteristics indicated in the request and that are able to communicate with the test device 104. For example, one or more characteristics of the test device 104, such as hardware or software components of the test device 104, may be indicated in the request or determined by the communication API 402 based on characteristics of the requests. The host devices 120 that are determined may include host devices 120 that are able to exchange data with a test device 104 having the determined characteristics.

The communication API 402 may provide an indication of the determined host devices 120 and in some cases, characteristics of the host devices 120 to the test device 104. At 408, the test device 104 may determine sets of communication parameters for communication with the determined host devices 120. For example, for each host device 120 determined by the communication API 402, the test device 104 may determine one or more sets of communication parameters that may be used to exchange data with the host device 120. Sets of communication parameters associated with the test device 104 may include protocols that may be used by the test device 104 to communicate with the host device 120, networks 122 that may be used by the test device 104 to exchange data with the host device 120, types or formats of data that may be exchanged with the host device 120, intermediate computing devices through which data may be routed, and so forth. At 410, the test device 104 may send data indicative of the determined sets of communication parameters to the communication API 402. In other implementations, the communication API 402 or another computing device in communication with the test device 104 may determine the sets of communication parameters based on characteristics of the test device 104.

At 412, the communication API 402 may send data indicative of the sets of communication parameters, determined by the test device 104, to the host device 120. At 414, the host device 120 may determine sets of communication parameters for communication with the test device 104. In some implementations, the communication parameters determined by the host device 120 may be based in part on the communication parameters determined by the test device 104 and sent to the host device 120 by the communication API 402. For example, the host device 120 may determine sets of communication parameters for communication with the test device 104 that are included within the sets of communication parameters received from the communication API 402. In other implementations, the communication parameters determined by the host device 120 may be independent from those determined by the test device 104. For example, while FIG. 4 depicts block 414 subsequent to blocks 410 and 412, the host device 120 may determine sets of communication parameters for communication with the test device 104 asynchronously relative to determination of the communication parameters by the test device 104. Continuing the example, the host device 120 may receive an identifier or other indication of the test device 104 and may determine sets of communication parameters for communication with the test device 104 before, during, or after receipt of communication parameters determined by the test device 104 from the communication API 402.

At 416, the host device 120 may send data indicative of the determined sets of communication parameters to the communication API 402. At 418, the communication API 402 may send data indicative of the sets of communication parameters determined by the host device 120 to the test device 104.

At 420, the test device 104 may determine one or more sets of specific communication parameters for use communicating with the host device 120 based on the sets of communication parameters determined by the test device 104 and the sets of communication parameters received from the host device 120. Similarly, at 422, the host device 120 may determine one or more sets of specific communication parameters for use communicating with the test device 104 based on the sets of communication parameters determined by the host device 120 and the sets of communication parameters received from the test device 104. In some implementations, the specific communication parameters determined by each device may include one or more sets of communication parameters that are common to the sets of communication parameters determined by each device. In some cases, the specific communication parameters may be constrained by one or more security features associated with the test device 104, the host device 120, or one or more networks 122 in communication with either device. For example, a firewall or another type of constraint may limit use of certain communication parameters. Continuing the example, a firewall may prevent direct communication from the test device 104 to the host device 120, or use of particular networks 122 or intermediate computing devices. In such a case, the specific communication parameters that are determined may exclude sets of communication parameters that are unavailable due to the firewall or other security feature. In other implementations, communication metrics associated with different sets of communication parameters may be determined, and the set of communication parameters used by the devices may be determined based in part on the communication metrics. For example, the specific set of communication parameters that is used may be selected to minimize latency, maximize data throughput, and so forth. In still other implementations, geolocations for the test device 104 and host device 120 may be used to determine one or more sets of communication parameters that may be preferentially used over one or more other sets of communication parameters. For example, a computing device that operates using a virtual private network (VPN) associated with a first geolocation, that is physically located in a second geolocation, may communicate with greater efficiency using one or more devices proximate to the second geolocation. In such a case, sets of communication parameters associated with one or more devices proximate to the second geolocation may be used over one or more other sets of communication parameters.

At 424, the test device 104 may determine a successful connection with the host device 120. At 426, the host device 120 may similarly determine a successful connection with the test device 104. In some implementations, multiple connections may be established between the test device 104 and the host device 120. For example, simultaneous use of multiple communication methods may enable transmission of data at a greater rate. As another example, establishment of multiple communication methods may enable a second communication method to use if a first communication method fails or if one or more communication metrics associated with the first method, such as latency, exceed a threshold value. Determination of a successful connection may include performing a handshake process, an authentication process, exchanging data to determine successful receipt of the data, and so forth. In some cases, determination of a successful connection may include determining successful encryption and decryption of data by one or both devices, use of proper protocols and ports as indicated in the communication parameters, and so forth.

At 428, the test device 104 may execute the AUT 102 and send test data 108 associated with performance of the AUT 102, or performance of the test device 104, to the host device 120. For example, sending of the test data 108 may include continuously or asynchronously sending one or more data streams from the test device 104 to the host device 102. Continuing the example, the data stream(s) may include screen capture data, audio capture data, input data, values indicative of use of computational resources, or values indicative of communication metrics associated with execution of the application by the test device 104. At 430, the host device 120 may cause the test device 104 to execute the AUT 102 and may receive the test data 108 from the test device 104. For example, in request to a request from a destination device 106, or independent of such a request, the host device 120 may provide instructions to the test device 104 to cause the test device 104 to execute the AUT 102 or perform one or more other functions. In other implementations, the test device 104 may execute the AUT 102 independent of instructions from the host device 120. The test device 104 may determine test data 108 associated with execution of the AUT 102. In some implementations, the test device 104 may send only a portion of the test data 108 to the host device 120. For example, the test device 104 may determine a portion of the test data 108 associated with configuration of the test device 104 or with communication between the test device 104 and another device, such as acknowledgement codes, and may refrain from sending this portion of the test data 108 to reduce use of computational resources and enable the remainder of the test data 108 to be sent with greater efficiency. In other implementations, the host device 120 may receive the entirety of the test data 108 and may determine portions of the test data 108 related to execution of the AUT 102 and other portions of the test data 108 that relate to configuration of the test device 104 or communication of the test device 104 with one or more other devices. The host device 120 may then withhold portions of the test data 108 that are not related to performance of the AUT 102 or of the test device 104 from transmission to a destination device 106 or other computing devices.

Figure 5:
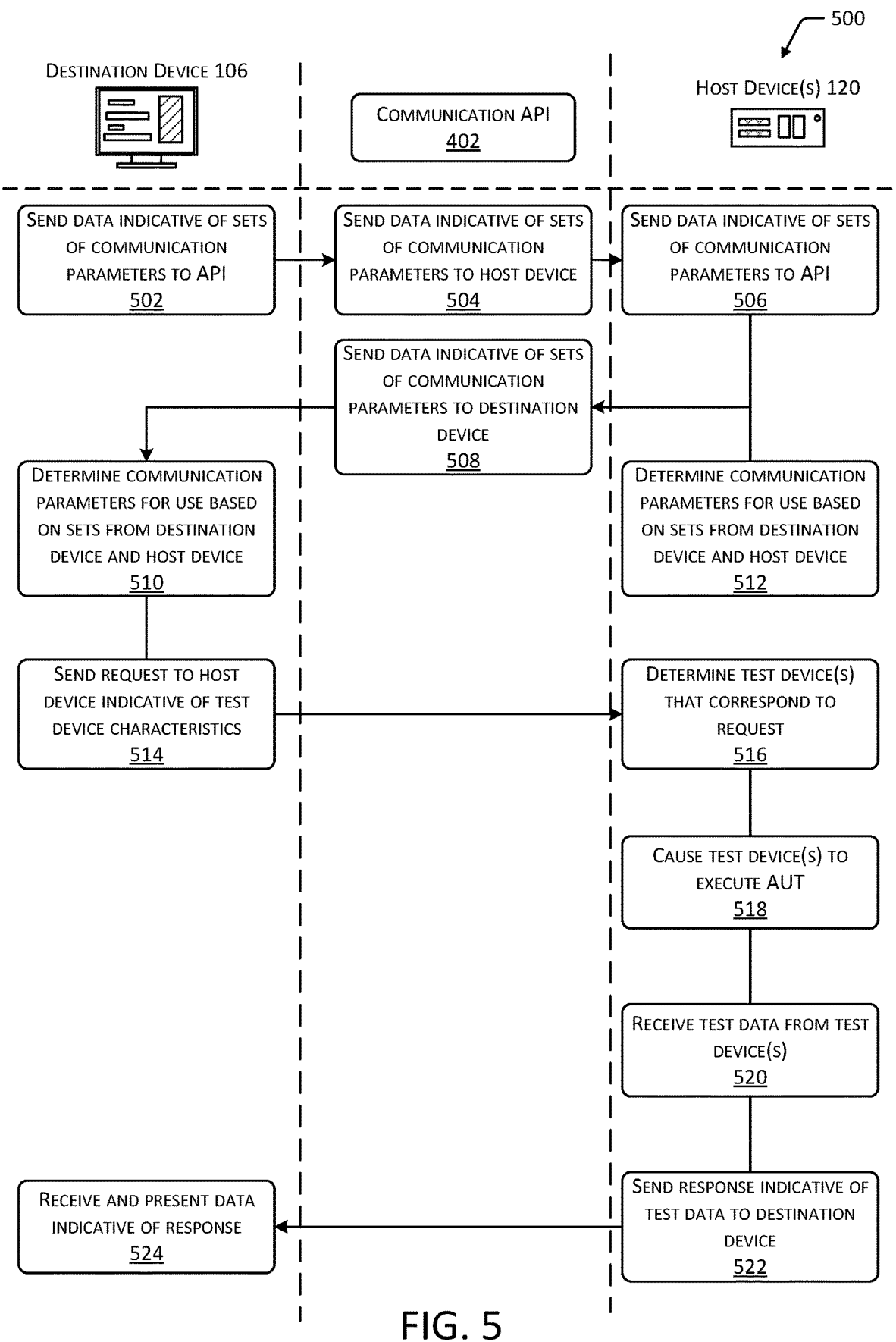
FIG. 5 is a flow diagram depicting an implementation of a method for establishing communication between a host device and a destination device and providing data associated with an application under test or a test device in response to a request from the destination device.

FIG. 5 is a flow diagram 500 depicting an implementation of a method for establishing communication between a host device 120 and a destination device 106 and providing data associated with an application under test 102 or a test device 104 in response to a request from the destination device 106. The destination device 106 and the host device 120 may establish communication using the same or a similar method to that described with regard to establishment of communication between the test device 104 and the host device 120 of FIG. 4. For example, at 502, the destination device 106 may send data indicative of sets of communication parameters that may be used to communicate with the host device 120 to the communication API 402. At 504, the communication API 402 may send data indicative of the sets of communication parameters from the destination device 106 to the host device 120. At 506, the host device 120 may send data indicative of sets of communication parameters that may be used to communicate with the destination device 106 to the communication API 402. At 508, the communication API 402 may send data indicative of the sets of communication parameters determined by the host device 120 to the destination device 106.

At 510, the destination device 106 may determine one or more sets of specific communication parameters for use communicating with the host device 120 based on the sets of communication parameters determined by each device. Similarly, at 512, the host device 120 may determine one or more sets of specific communication parameters for use communicating with the destination device 106 based on the sets of communication parameters determined by each device. For example, the specific set of communication parameters used by each device may include one or more sets of communication parameters that are common to the sets determined by each device. As described with regard to FIG. 4, in some implementations, the sets of communication parameters that are used may also be determined based on one or more security features or communication metrics associated with the parameters. Additionally, as described with regard to FIG. 4, in some implementations, multiple sets of communication parameters may be determined and used to establish multiple channels of communication between the destination device 106 and the host device 120.

At 514, the destination device 106 may send a request to the host device 120 indicative of test device characteristics. For example, the request may indicate a particular geolocation, a particular network 122, a particular AUT 102, a particular test device 104, characteristics of networks 122, geolocations, AUTs 102, or test devices 104, and so forth. Continuing the example, the request may specify a particular AUT 102 to be tested using a specific type of test device 104 that is located at a particular geolocation.

At 516, the host device 120 may determine test device(s) 104 that correspond to the request. As described with regard to FIG. 1, the host device 120, or another computing device in communication with the host device 120, may store device data 130 indicative of characteristics of test devices 104 or other computing devices accessible to the host device 120. Based on correspondence between the device data 130 and the request, the host device 120 may determine one or more test devices 104 having characteristics that match the request. For example, the host device 120 may determine specific test devices 104 of a type specified in the request, that are capable of executing the AUT 102 specified in the request, and that are located in the geolocation indicated in the request.

At 518, the host device 120 may cause the determined test device(s) 104 to execute the AUT 102. For example, the host device 120 may provide instructions to one or more test devices 104 to cause execution of the AUT 102 or performance of other functions. In other implementations, a test device 104 may execute the AUT 102 independent of the host device 120 and may determine and store test data 108. At least a portion of the test data 108 may be provided to the host device 120 in response to the request, or in other implementations, test data 108 may be provided to the host device 120 independent of the request. At 520, the host device 120 may receive test data 108 from the test device 104. For example, the test device 104 may begin to provide to the host device 102 one or more data streams indicative of video output, audio output, communication metrics, functions performed by the test device 104, and so forth. In some cases, the host device 120 may provide this data to the destination device 106 as it is received from the test device 104. In other cases, the host device 120 may provide this data to the destination device 106 asynchronously.

At 522, the host device 120 may send a response indicative of the test data 108 to the destination device 106. The response may include the test data 108, a portion of the test data 108, log data or interface data 132 based on the test data 108, or combinations thereof. At 524, the destination device 106 may receive the response and present data indicative of the response. For example, the destination device 106 may present an interface, and output indicative of one or more logs, or other output representative of at least a portion of the test data 108.

Figure 6:
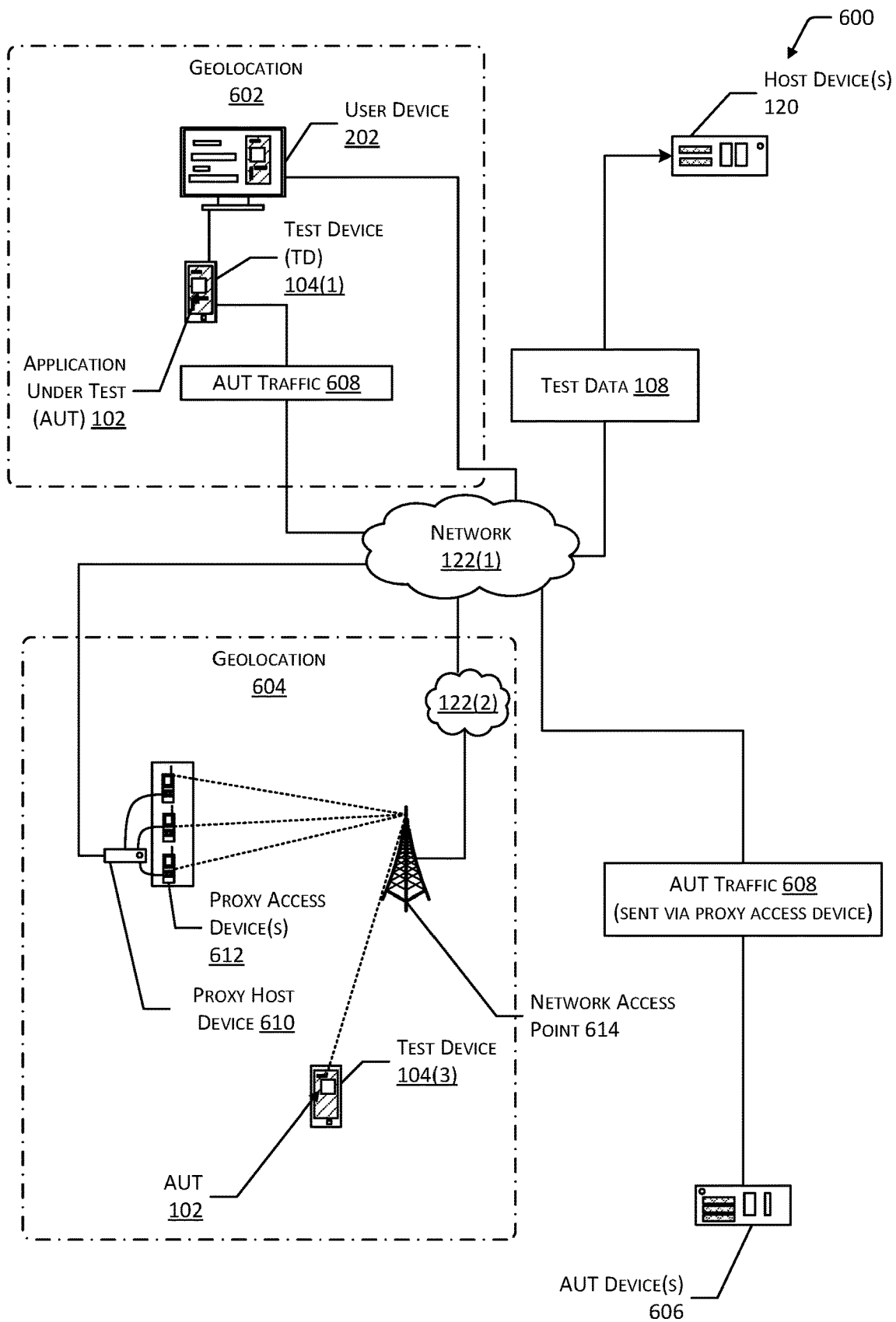
FIG. 6 is a diagram depicting an implementation of a system for testing an application under test (AUT) using test devices at various locations.

FIG. 6 is a diagram 600 depicting an implementation of a system for testing an application under test (AUT) 102 using test devices 104 at various locations. An AUT 102 may be executed on one or more different types of computing devices, such as smartphones, laptop computers, tablet computers, wearable computing devices, embedded devices, desktop computers, computing devices associated with vehicles, servers, computing devices associated with appliances or media devices, set top box devices, smart televisions, networked speaker devices, and so forth. For example, a test device 104 may include a smartphone or other type of computing device in wireless communication with a host device 120, a computing device in wired communication with the host device 120, a computing device in wired communication with a workstation or other type of user device 202 which is in wireless communication with the host device 120, and so forth. When executing the AUT 102, a test device 104 may present an output, acquire an input, generate data, receive or process data, and so forth. The AUT 102 may include an application that is at any stage in a development or maintenance lifecycle. For example, the AUT 102 may include software that has not yet been released (e.g., an alpha, prerelease, or pre-launch version), or may include a previously released version that is undergoing testing. In some implementations, the test device(s) 104, user device 202, host device 120, or one or more other computing devices in communication with a test device 104 may include an integrated development environment (IDE) to facilitate the creation and editing of program code, debugging, compiling, and so forth.

In some implementations, a test device 104, user device 202, host device 120, or other computing device(s) may include an emulator or simulator that is designed to execute the AUT 102 as though the AUT 102 were executing on another piece of hardware, using a different operating system, and so forth. For example, a test device 104 on which the AUT 102 is executed may be located at a first geolocation 602, which may be geographically separate from a second geolocation 604. The first geolocation 602 and second geolocation 604 may include any type of geographic location, such as a particular room, building, city, state, country, and so forth. For example, a geographic location may be specified by a set of coordinates with regard to latitude and longitude on the surface of the Earth.

A test device 104 or user device 202 may be connected to a first network 122(1). The first network 122(1) may, in turn, be connected to or be part of a larger network. For example, the first network 122(1) may comprise the Internet, or the first network 122(1) may be in communication with the Internet. The connection used by the test device 104 or user device 202 may include, without limitation, a wired Ethernet connection, a wireless local area network (WLAN) connection such as Wi-Fi, and so forth. For example, the first geolocation 602 may include an office, and the test device 104 may connect to a local Wi-Fi access point that is connected via an Ethernet cable to a router. The router, in turn, may be connected to a cable modem that provides connectivity to the Internet. During operation, the AUT 102 may access one or more external resources. For example, external resources may be stored in association with one or more AUT devices 606. The AUT device(s) 606 may include any number and any type of computing devices including, without limitation, the types of computing devices described with regard to the test device 104, destination device 106, host device 120, or user device 202.

The AUT 102 may access, generate, transmit, or receive data. For example, the AUT 102 may cause AUT traffic 608 to be exchanged with one or more AUT devices 606 or other computing devices during operation. Traditionally, AUT traffic 608 associated with a test device 104 at the first geolocation 602 would be sent to the first network 122(1), and then to the AUT device(s) 608. However, this traditional situation may only enable test data 108 to be generated based on the conditions associated with the first geolocation 602 and first network 122(1). For example, the characteristics of other networks or devices located at other geolocations may cause generation of test data 108 indicative of different characteristics of an output presented by a test device 104, conditions of a network 122, performance of a test device 104, and so forth. However, this information may not be discoverable using test data 108 that is associated only with the first geolocation 602 and first network 122(1).

To enable the AUT 102 to be tested under conditions associated with different locations, such as the second geolocation 604, and different networks 122(2), a software development kit (SDK) may be incorporated into the AUT 102. In other implementations, techniques other than an SDK may be used to provide the functionality described herein. For example, lines of computer code that provide the functionality of at least a portion of the SDK may be incorporated into the code base of the AUT 102. The SDK may provide a user interface that allows for the redirection of the AUT traffic 608. For example, the SDK may include instructions to establish communication with one or more host devices 120, such as servers or other computing devices, which may include modules for coordinating the activities of devices and analyzing data determined from the devices. As described with regard to FIGS. 1-5, the host device(s) 120 may determine test data 108 indicative of performance of an AUT 102 or of a test device 104 executing the AUT 102. For example, test data 108 may be indicative of video or audio quality or other characteristics of an output presented by a test device 104, data indicative of network conditions, data indicative of the particular functions performed by a test device 104 or components of the test device 104 that are used while executing the AUT 102, data relating to power or computational resources used by a test device 104 to perform various functions, and so forth.

In other implementations, an SDK may be used to determine data associated with functions performed by the AUT 102 without requiring transmission of the data to other devices. For example, a test device 104, user device 202, or other device executing an AUT 102 or in communication with a device executing the AUT 102 may determine test data 108 without transmitting data to the host device(s) 120.

In cases where data is sent to a host device 120, the host device 120 may coordinate the activities of one or more proxy host devices 610 or proxy access devices 612. A proxy host device 610 may connect to the first network 122(1) and to one or more of the proxy access devices 612. In one implementation, the proxy host device 610 may include a server, desktop computer, tablet, or other type of computing device to which multiple proxy access devices 612 are connected using a wired connection, such as a cable connecting each proxy access device 612 to a USB port of the proxy host device 610. While FIG. 6 depicts a single proxy host device 610 and three proxy access devices 612, any number of proxy host devices 610 and proxy access devices 612 may be used. In some implementations, proxy host devices 610 and proxy access devices 612 may be placed in an enclosure at the second geolocation 604 to prevent unauthorized access to the devices or unauthorized transmission of content presented using the devices to individuals outside of the enclosure.

The proxy access devices 612 may connect to a network access point 614 that provides connectivity to a second network 122(2). Use of the proxy access devices 612 to perform functions associated with an AUT 102 may therefore enable data regarding performance of the functions to be determined when different types of devices are used, and when a second network 122(2) having different characteristics than the first network 122(1) is used. For example, the proxy access devices 612 may include commodity cellphones, the network access points 614 may include cell phone towers, and the second network 122(2) may include a WWAN, such as a wireless cellular data network (WCDN). The second network 122(2) may in turn communicate with the first network 122(1). For example, a WCDN operated by a telecommunication company may interconnect or have a peering agreement with an Internet backbone provider. As a result, a user of the second network 122(2) may be able to access resources on the first network 122(1), and vice versa. In some implementations, the proxy access devices 612 may be capable of communication with the AUT device(s) 606 or other devices using the second network 122(2) or another network, such as a cellular network, without communicating using the first network 122(1).

The proxy access devices 612 may be located at the second geolocation 604, which may be geographically removed from the first geolocation 602 where the test device 104 is located. For example, the proxy access devices 612 may be located in another city, state, country, and so forth that differs from the location of the test device 104. As part of the testing process for the AUT 102, a user interface may be presented to enable a user at the first geolocation 602 to select one or more of a particular geolocation, such as the second geolocation 604, or particular proxy access device 612 to use during testing. The host device(s) 120 may maintain information about the proxy access devices 612, such as geolocation, availability, cost, characteristics of the proxy access device 612, and so forth. The host device(s)

120 may coordinate establishment of a connection between the AUT 102 and the proxy access device 612 that was selected. For example, establishment of a connection may be performed using the methods described with regard to FIGS. 4 and 5.

During testing, the AUT traffic 608 may be routed through the first network 122(1) to the proxy host device 610, then through the proxy access device 612 to the second network 122(2), and then on to the first network 122(1) to ultimately arrive at the AUT device 606. The AUT traffic 608 may include outbound application traffic sent from the AUT 102 to the AUT device 606 and inbound application traffic sent from the AUT device 606 to the AUT 102. In some cases, at least a portion of the AUT traffic 608 may include test data 108 indicative of an output presented by a device, input received by the device, computational resources or components used by a device, characteristics of a network used by a device, and so forth.

During operation, the AUT 102 may direct outbound application traffic to the proxy host device 610, which may transfer the outbound application traffic to the proxy access device 612, which may then send the outbound application traffic to the second network 122(2). The second network 122(2) may send the outbound application traffic to the AUT device 606. Inbound application traffic from the AUT device 606 may follow the reverse path. The host device(s) 120, or one or more other devices, such as devices executing the SDK, may collect the test data 108 or other log data associated with operation of the system, such as information associated with operation of the proxy access device 612, packet capture of data transferred by the proxy host device 610, and so forth. For example, test data 108 may indicate, for a particular instant in time, one or more of: a current page on a website, type of network to which a proxy access device 612 is connected, quantity of data received, quantity of data transmitted, latency to the AUT device 606, data throughput, received signal strength, transmit power, cost associated with data transfer on the second network 122(2), and so forth. The data collected by the host device(s) 120 may therefore represent the AUT 102 operating on a real-world second network 122(2) at a desired geolocation, such as the second geolocation 604. In some implementations, test data 108 indicative of operation of the AUT 102 may be used to generate an interface indicative of characteristics of input received by a device executing the AUT 102, output presented by such a device, computational resources used by the device, and so forth. For example, a destination device 106 may receive the test data 108, or interface data 132 representing at least a portion of the test data 108, and may present an interface based on at least a portion of the test data 108.

In some implementations, instead of, or in addition to data determined by the host device(s) 120, one or more test devices 104(3) deployed at the second geolocation 604 may determine and provide test data 108 to the host device(s) 120. For example, the test device 104(3) at the second geolocation 604 may execute the AUT 102 or may communicate with another computing device that executes the AUT 102.

Data determined by operation of test devices 104, user devices 202, proxy access devices 612, and so forth may be used to generate interfaces, reports, determine modifications to the AUT 102, and so forth. In some cases, a proxy host device 610 and proxy access device 612 at a particular geolocation may not be present, or may not be usable to execute a particular AUT 102. In such a case, a test device 104 that wirelessly communicates with a host device 120 using the techniques described with regard to FIGS. 1-5, or a test device 104 in communication with a user device 202 that communicates with the host device 120, may enable execution of the AUT 102 at a desired geolocation to be tested. Additionally, in some cases, a device executing the AUT 102 may output or store proprietary information. In such a case, a test device 104 carried by an authorized user may be more secure than proxy devices stored at a location. In other cases, a secure test device 104 may be configured to preserve the privacy of the data. For example, an SDK that is incorporated within a device may be used to determine test data 108 and other data regarding execution of an AUT 102 while preventing access to data associated with the AUT 102 to users or other devices.

Figure 7:
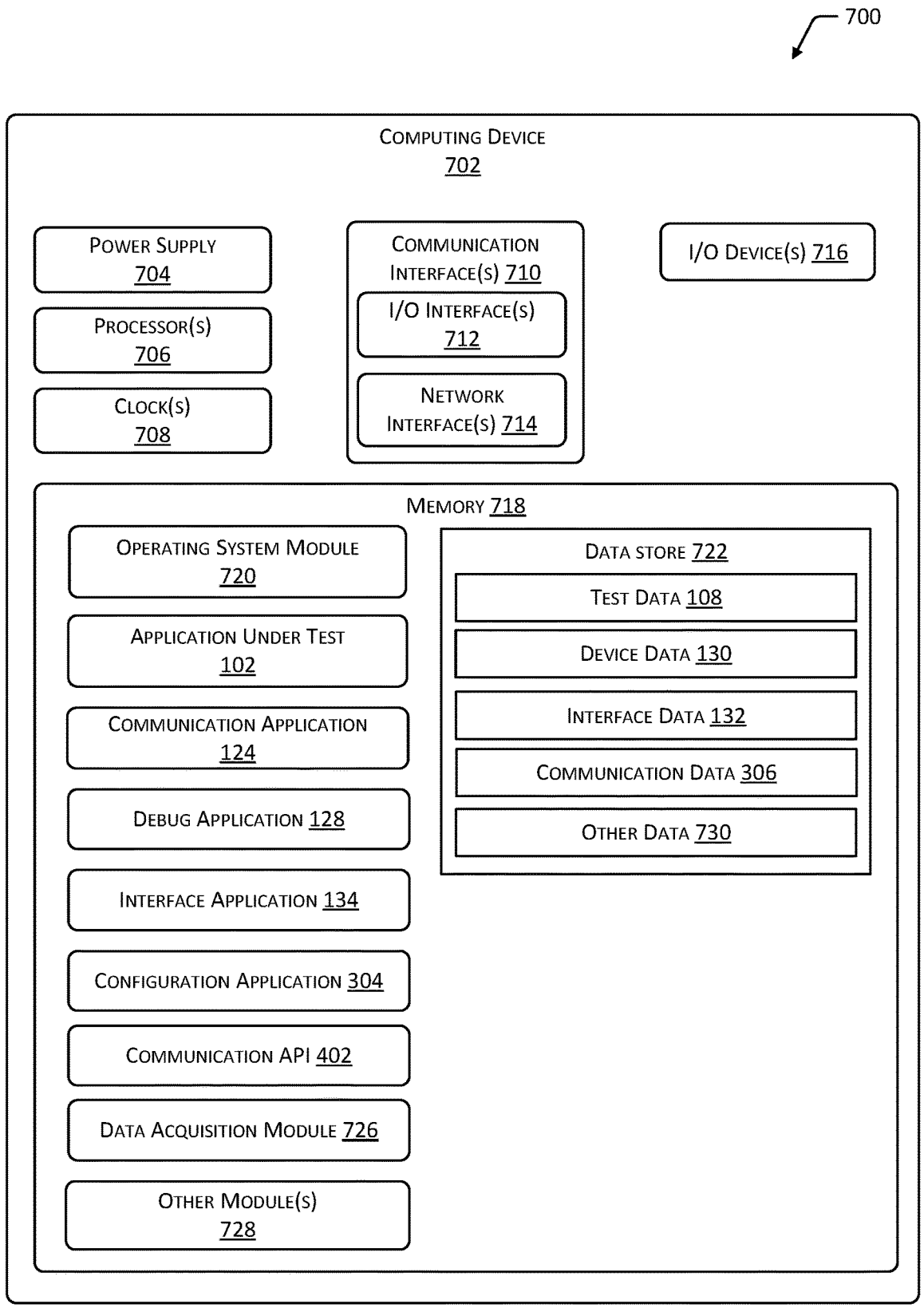
FIG. 7 is a block diagram depicting an implementation of a computing device within the present disclosure.

FIG. 7 is a block diagram 700 depicting an implementation of a computing device 702 within the present disclosure. The computing device 702 may include one or more test devices 104, destination devices 106, host devices 120, user devices 202, connected devices 302, or other computing device(s) 702 in communication with a test device 104. For example, while FIGS. 1-3 describe example systems in which various functions are performed by test devices 104, destination devices 106, host devices 120, user devices 202, and connected devices 302, other combinations of computing devices 702 may perform the functions that are described. Continuing the example, a single computing device may perform each of the described functions, or multiple computing devices may each perform one or more functions. Additionally, while FIG. 7 depicts a single block diagram 700 of an example computing device 702, any number and any type of computing devices 702 may be used to perform the functions described herein. For example, a portion of the functions described herein may be performed by one or more host devices 120, while other functions may be performed by one or more test devices 104.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 704 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input devices or output devices associated with the computing device 702. For example, I/O devices 716 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 716 may be physically incorporated with the computing device 702. In other implementations, I/O devices 716 may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, 5G, LTE, and so forth.

The computing device 702 may include one or more buses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC). In some implementations, the functionality described with regard to one or more of the modules may be incorporated within a software development kit (SDK), may be performed using one or more APIs, and so forth.

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

The communication application 124 may be configured to establish communications with one or more other computing devices 702. Communications may be authenticated, encrypted, and so forth. Communication may be established between computing devices 702 by determining sets of communication parameters, such as protocols, types or formats of data, networks 122, and routes for transmission of data that may be used by two computing devices 702 when sending or receiving data. For example, a first computing device 702 may determine one or more first sets of communication parameters that may be used to exchange data with a second computing device 702, and the second computing device 702 may determine one or more second sets of communication parameters that may be used to exchange data with the first computing device 702. A set of communication parameters that is common between the sets determined by each computing device 702 may then be used to establish communication. In some implementations, the communication application 124 may determine one or more communication parameters that are unavailable from use due to a firewall or other type of security feature, and the set of communication parameters that is determined for use may exclude communication parameters prevented from use by a security feature. In some implementations, if multiple sets of communication parameters may be used, a set of communication parameters may be selected for use based on one or more metric values indicative of latency, data throughput, or other characteristics of communication between computing devices 702. For example, a set of communication parameters may be selected for use based on the communication parameters being associated with latency less than a threshold or less than latency associated with another set of communication parameters. In other implementations, if multiple sets of communication parameters may be used, a set of communication parameters may be selected for use based on a geolocation associated with one or more of the computing devices 702. In still other implementations, if multiple sets of communication parameters may be used, the computing device 702 may establish multiple communication channels with another computing device 702, and the communication channels may be used simultaneously or individually. For example, simultaneous use of multiple methods of communication may enable exchange of data at a greater rate. As another example, if a first method of communication is ceased or if communication parameters associated with the first method exceed a threshold, the computing device 702 may begin to use a second method of communication.

The memory 718 may also store one or more applications under test 102 (AUT). An AUT 102 may include code or other types of computer-executable instructions that may cause a device to perform one or more functions. In some implementations, the functions may be associated with one or more I/O devices 716, such as acquiring data using a camera or microphone, or presenting output using a display or speaker. Functions may also include generation, processing, or presentation of data. Characteristics of the data associated with a computing device 702 executing the AUT 102 may be used to determine performance of the AUT 102 or of the computing device 702 under various conditions. For example, a particular function of the AUT 102 may be recorded over time, and the network conditions, device conditions, and other factors that may affect performance of the AUT 102 at particular times may also be determined. An interface or another type of output may be presented that associates performance of the AUT 102 with times at which the performance occurred and other characteristics of the AUT 102, device, network, and so forth.

The memory 718 may also include a debug application 128. The debug application 128 may receive test data 108 or other data associated with execution of an AUT 102 or performance of a computing device 702 while executing the AUT 102. For example, the debug application 128 may include a debug bridge, a daemon, or a similar component executing on a computing device 702.

The memory 718 may additionally include an interface application 134. The interface application 134 may generate an interface or other type of output based on test data 108, log data, interface data 132 or other data representing performance of an AUT 102 or performance of a computing device 702 executing the AUT 102. For example, an interface representative of at least a portion of test data 108 associated with execution of an AUT 102 may associate aspects of the AUT 102, such as quality of a video output, and aspects of the computing device 702 executing the AUT 102, such as processor or memory use, with the times at which these aspects occurred. Based on the interface, times at which potential issues associated with execution of the AUT 102 occurred, such as a particular value associated with the AUT 102 or computing device 702 exceeding a threshold value, and the functions that may have caused the issues to occur may be identified, which may enable modifications to the AUT 102 that may improve performance to be determined.

The memory 718 may also include a configuration application 304. The configuration application 304 may configure a computing device 702 to execute an AUT 102, determine test data 108, communicate with other computing devices 702 to send or receive test data 108, and so forth. For example, the configuration application may cause a computing device 702 to modify one or more configurations based on the communication data 306. In some implementations, the communication data 306 may include a communication application 124(1). For example, the configuration application 304 may install or transfer the communication application 124(1) to data storage associated with the computing device 702. In some implementations, the configuration application 304 may be configured to provide or utilize the communication data 306 or otherwise configure the computing device 702 upon occurrence of one or more conditions, such as each time the computing device 702 is rebooted or power-cycled.

The computing device 702 may additionally store the communication API 402. The communication API 402 may be used to establish communication between computing devices 702. For example, as described with regard to FIG. 4, the communication API 402 may receive requests for communication from one or more computing devices 702, receive indications of communication parameters from computing devices, and may provide indications of usable communication parameters to other computing devices 702. Based on the data indicative of the communication parameters, computing devices 702 may determine a set of communication parameters for use for exchanging data.

The computing device 702 may further store a data acquisition module 726. The data acquisition module 726 may acquire data streams from one or more computing devices 702 executing an AUT 102. Data streams may include AUT traffic 608, test data 108, or other data associated with execution of an AUT 102, such as log data. In some implementations, data streams may be acquired from devices using one or more APIs. For example, an existing API associated with one or more computing devices 702 that normally produces a data stream, such as an audio or video data stream, may also be used to provide data streams to one or more other computing devices 702. In some implementations, data streams associated with one or more devices may be associated with times at which the data streams were generated. Based on the times associated with each data stream, the data acquisition module 726, or another module in the memory 718, may synchronize the data streams, such that characteristics of functions performed by computing devices 702 at particular times may be determined.

Other modules 728 may also be present in the memory 718. For example, other modules 728 may include user interface modules for determining interface data 132 based on test data 108, which may be used for generation of interfaces. Other modules 728 may include logging modules for determining log data based on characteristics of one or more computing devices 702 or networks 122 during performance of functions associated with an AUT 102. Other modules 728 may also include encryption modules to encrypt and decrypt communications between computing devices 702, authentication modules to authenticate communications sent or received by computing devices 702, a permission module to assign, determine, and manage user permissions to access or modify data associated with computing devices 702, and so forth.

Other data 730 within the data store(s) 722 may include configurations, settings, preferences, and default values associated with computing devices 702. Other data 730 may also include encryption keys and schema, access credentials, threshold data, and so forth. Other data 730 may additionally include rules or criteria for determining when to cause devices to perform functions, such as execution of an AUT 102 or performance of other functions, transmission of data, and so forth.

In different implementations, different computing devices 702 may have different capabilities or capacities. For example, host devices 120, such as servers, may have greater processing capabilities or data storage capacity than test devices 104, such as smartphones.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first computing device;
a second computing device;
one or more first hardware processors associated with the first computing device to execute first computer-executable instructions to:
determine first data indicative of one or more first sets of communication parameters for communication with the second computing device;
provide at least a portion of the first data to the second computing device;
receive second data indicative of one or more second sets of communication parameters from the second computing device;
determine, based on the first data and the second data, a third set of communication parameters and a fourth set of communication parameters for communication with the second computing device; and
send third data associated with a first application to the second computing device based on one or more of the third set of communication parameters or the fourth set of communication parameters; and
one or more second hardware processors associated with the second computing device to execute second computer-executable instructions to:
determine the one or more second sets of communication parameters for communication with the first computing device;
provide the second data to the first computing device;
determine the third set of communication parameters and the fourth set of communication parameters for communication with the first computing device; and
receive the third data based on the one or more of the third set of communication parameters or the fourth set of communication parameters.

2. The system of claim 1, further comprising:
a third computing device; and
second computer-executable instructions to cause the second computing device to:
receive, from the third computing device, a request associated with the first computing device; and
in response to the request, provide at least a portion of the third data to the third computing device.

3. The system of claim 1, wherein one or more of the first computer-executable instructions or the second computer-executable instructions further comprise instructions to:
determine a fifth set of communication parameters that is common to the one or more first sets of communication parameters and the one or more second sets of communication parameters;
determine a sixth set of communication parameters that is unavailable for use with one or more of:
the first computing device,
the second computing device,
a network accessible by at least one of the first computing device or the second computing device, or
a third computing device accessible by the at least one of the first computing device or the second computing device; and
determine that the third set of communication parameters and the fourth set of communication parameters are included in the fifth set of communication parameters and do not include the sixth set of communication parameters.

4. The system of claim 1, wherein one or more of the first computer-executable instructions or the second computer-executable instructions further comprise instructions to:
determine that a first metric value associated with the third set of communication parameters is greater than one or more of: a threshold metric value or a second metric value associated with the fourth set of communication parameters;
wherein the third data is sent based on the third set of communication parameters in response to the first metric value being greater than the one or more of the threshold metric value or the second metric value.

5. The system of claim 1, further comprising:
a third computing device in wired communication with the first computing device; and
one or more third hardware processors associated with the third computing device to execute third computer-executable instructions to:
execute the first application; and
provide the third data to the first computing device using the wired communication.

6. The system of claim 1, further comprising:
a third computing device in wired communication with the first computing device; and
one or more third hardware processors associated with the third computing device to execute third computer-executable instructions to:
cause the first computing device to acquire fourth data, and based on the fourth data, configure the first computing device to determine the third set of communication parameters and send the third data to the second computing device.

7. The system of claim 1, wherein the first computer-executable instructions further comprise instructions to:
execute the first application;
determine fourth data associated with communication with the second computing device;
determine fifth data associated with execution of the first application, wherein the fifth data indicates one or more characteristics of data that are indicative of one or more metrics associated with the first application; and
determine the third data based on correspondence between the fourth data and the fifth data, wherein the third data includes a subset of the fourth data.

8. The system of claim 1, wherein the first computer-executable instructions to send the third data include first computer-executable instructions to:
send a first portion of the third data using a first communication method based on the third set of communication parameters; and
send a second portion of the third data using a second communication method based on the fourth set of communication parameters at least partially concurrently with sending the first portion of the third data using the first communication method.

9. A method comprising:
causing a first computing device to execute a first application;
determining, using one or more of the first computing device or a second computing device in wired communication with the first computing device, first data associated with execution of the first application;
determining, using the one or more of the first computing device or the second computing device, a first portion of the first data associated with communication between the first computing device and one or more of the second computing device or a third computing device in wireless communication with one or more of the first computing device or the second computing device;
determining, using the one or more of the first computing device or the second computing device, a second portion of the first data associated with performance of one or more of the first application or the first computing device during execution of the first application; and
causing the one or more of the first computing device or the second computing device to send the second portion of the first data to the third computing device.

10. The method of claim 9, wherein the first portion of the first data includes one or more acknowledgement codes indicative of one or more of: receipt of data by the first computing device, transmission of data by the first computing device, receipt of data by the second computing device, or transmission of data by the second computing device.

11. The method of claim 9, wherein the first portion of the first data includes one or more communication parameters associated with communication between the first computing device and the one or more of the second computing device or the third computing device, and the one or more communication parameters include an indication of one or more of:
one or more protocols associated with communication between the first computing device and the one or more of the second computing device or the third computing device;
one or more networks associated with communication between the first computing device and the one or more of the second computing device or the third computing device; or
one or more fourth computing devices associated with communication between the first computing device and the one or more of the second computing device or the third computing device.

12. The method of claim 9, wherein the causing the one or more of the first computing device or the second computing device to send the second portion of the first data to the third computing device comprises:
causing the first computing device to transmit the second portion of the first data to the second computing device using the wired communication; and
causing the second computing device to transmit the second portion of the first data to the third computing device using the wireless communication;
the method further comprising:
receiving, from a fourth computing device, a request associated with the first computing device; and
in response to the request, providing an indication of the second portion of the first data from the third computing device to the fourth computing device.

13. The method of claim 9, further comprising:
causing the second computing device to provide second data to the first computing device using the wired communication, wherein the second data is associated with communication with the third computing device;
causing the first computing device to use the second data to configure the first computing device for communication with the third computing device by:
determining one or more first sets of communication parameters for communication with the third computing device;
receiving third data indicative of one or more second sets of communication parameters associated with the third computing device; and
determining, based on the one or more first sets of communication parameters and the third data, a third set of communication parameters and a fourth set of communication parameters for communication with the third computing device; and
causing the first computing device to send the second portion of the first data to the third computing device based on one or more of the third set of communication parameters or the fourth set of communication parameters.

14. The method of claim 9, further comprising:
causing the one or more of the first computing device or the second computing device to execute a second application to determine information associated with debugging of the first application; and
causing the one or more of the first computing device or the second computing device to send at least a portion of the information associated with the debugging of the first application to the third computing device.

15. A system comprising:
a first computing device associated with a first geolocation;
a second computing device in communication with the first computing device, wherein the second computing device is associated with a second geolocation; and
one or more first hardware processors associated with the first computing device to execute first computer-executable instructions to:
determine first data indicative of one or more first sets of communication parameters for communication with the second computing device;
receive second data indicative of one or more second sets of communication parameters from the second computing device;
determine, based on one or more of the first data or the second data, the second geolocation of the second computing device;
determine, based on the first data, the second data, and the second geolocation, a third set of communication parameters for communication with the second computing device; and
send at least a portion of third data associated with a first application to the second computing device based on the third set of communication parameters.

16. The system of claim 15, further comprising:

a third computing device in wired communication with the second computing device, wherein the third computing device executes the first application and provides the third data to the first computing device using the wired communication.

17. The system of claim 16, wherein the first computer-executable instructions further comprise instructions to:

determine a first portion of the third data that is associated with communication between the first computing device and the third computing device; and determine a second portion of the third data that is associated with execution of the first application;

wherein the at least a portion of the third data sent to the second computing device includes the second portion of the third data.

18. The system of claim 15, further comprising:

a third computing device in wired communication with the first computing device;

wherein the first computer-executable instructions further comprise instructions to:

receive fourth data from the third computing device using the wired communication; and use the fourth data to configure the first computing device to:

send the first data to the second computing device, receive the second data from the second computing device, determine the third set of communication parameters, and send the at least a portion of the third data to the second computing device.

19. The system of claim 15, further comprising:

a third computing device in wireless communication with the second computing device; and one or more second hardware processors associated with the second computing device to execute second computer-executable instructions to:

receive, from the third computing device, a request indicative of the first computing device; and in response to the request, provide fourth data indicative of the at least a portion of the third data to the third computing device.

20. The system of claim 15, further comprising first computer-executable instructions to:

determine, based on the first data, the second data, and the second geolocation, a fourth set of communication parameters for communication with the second computing device; and send at least a second portion of the third data to the second computing device based on the fourth set of communication parameters.

* * * * *